(12) United States Patent
Ahn et al.

(10) Patent No.: US 8,688,039 B2
(45) Date of Patent: Apr. 1, 2014

(54) METHOD AND APPARATUS FOR PROVIDING INFORMATION USING BLUETOOTH AND SYSTEM THEREFOR

(75) Inventors: Dong-Gyu Ahn, Suwon-si (KR); Keun-Ho Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 686 days.

(21) Appl. No.: 12/589,760

(22) Filed: Oct. 28, 2009

(65) Prior Publication Data

US 2010/0105328 A1    Apr. 29, 2010

(30) Foreign Application Priority Data

Oct. 29, 2008  (KR) .......................... 10-2008-0106708

(51) Int. Cl.
*H04B 7/00*  (2006.01)
(52) U.S. Cl.
USPC ........................................ 455/41.2

(58) Field of Classification Search
USPC ............. 455/412.1, 414.1, 414.2, 414.3, 419, 455/420
See application file for complete search history.

(56) References Cited

U.S. PATENT DOCUMENTS

| | | | |
|---|---|---|---|
| 7,103,313 B2 * | 9/2006 | Heinonen et al. ............. | 455/41.2 |
| 7,272,407 B2 * | 9/2007 | Strittmatter et al. .......... | 455/500 |
| 2002/0028658 A1 * | 3/2002 | Ami et al. ....................... | 455/41 |
| 2002/0183004 A1 * | 12/2002 | Fulton et al. .................... | 455/41 |
| 2009/0047991 A1 * | 2/2009 | Elg ............................. | 455/552.1 |

* cited by examiner

*Primary Examiner* — Yuwen Pan
*Assistant Examiner* — Ayodeji Ayotunde

(57) ABSTRACT

A method for providing information by an information providing device with a Bluetooth module in an information broadcast service based on Bluetooth. The method includes broadcasting an inquiry signal to provide the information; receiving an inquiry response signal; determining if a broadcast request is included in the inquiry response signal; and delivering the information to a Bluetooth device that sent the inquiry response signal, when a broadcast request is included in the inquiry response signal.

14 Claims, 5 Drawing Sheets

METHOD AND APPARATUS FOR PROVIDING INFORMATION USING BLUETOOTH AND SYSTEM THEREFOR

CROSS-REFERENCE TO RELATED APPLICATION(S) AND CLAIM OF PRIORITY

This application claims the benefit under 35 U.S.C. §119(a) of a Korean Patent Application filed in the Korean Intellectual Property Office on Oct. 29, 2008 and assigned Serial No. 10-2008-0106708, the entire disclosure of which is hereby incorporated by reference.

TECHNICAL FIELD OF THE INVENTION

The present invention relates to a method and system for providing information using Bluetooth®. More particularly, the present invention relates to a system, method and apparatus for effectively providing information to a Bluetooth® device that requires information with the limited time and space.

BACKGROUND OF THE INVENTION

Bluetooth® (hereinafter "Bluetooth"), a protocol for wirelessly connecting with a variety of terminals and Bluetooth devices using a frequency in a 2.4-GHz Industrial, Scientific, Medical (ISM) band, automatically or manually discovers (searches) other peripheral Bluetooth devices, if any, and keeps connections. The term "Bluetooth device" as used herein means a device equipped with a Bluetooth module performing Bluetooth communication.

This Bluetooth protocol is applied to all sorts of devices such as, for example, a monitor, a keyboard, a mouse, a wireless headset, a mobile phone, a wireless Local Area Network (LAN) and the like. The Bluetooth protocol may also be used for an information broadcast service that provides various information to Bluetooth devices in the limited space. Examples of the information broadcast service may include advertisement broadcasting in shopping malls, station information broadcasting by public transportation means such as subways and buses, and exhibition broadcasting in exhibition halls.

Generally, a Bluetooth-based information broadcasting scheme can be roughly classified into two types. In a first scheme, when Bluetooth devices that desire to receive information discovers an information providing device that is broadcasting information by continuously performing a discovery process using an inquiry signal, the Bluetooth devices access the information providing device and get (or pull) the information. In a second scheme, when an information providing device discovers a peripheral Bluetooth device by continuously performing a discovery process, the information providing device accesses the discovered Bluetooth device and delivers (or pushes) information to the Bluetooth device. The first scheme consumes excessive power and generates noises in terms of radio spectrum, since all Bluetooth devices should continuously send inquiry response signals. Therefore, the second scheme can be a more common Bluetooth-based information broadcasting scheme.

However, in the latter scheme where the information providing device provides information upon discovering a peripheral Bluetooth device through the inquiry process, the information may be delivered from the Bluetooth information providing device one-sidedly regardless of intention of the discovered Bluetooth device's user. Moreover, a user desiring to receive information may not receive the information.

For example, when an information providing device, serving as a master device, forms a piconet within specific search coverage having a radius of about one hundred meters (100 m) on the basis of a power class '1', the information providing device may establish Asynchronous Connection-Oriented Links (ACL) for data transmission/reception to a maximum of seven slave devices at a time. Therefore, in the case where more than seven peripheral Bluetooth devices exist, even though the time required for delivering (pushing) information is short, a certain Bluetooth device requiring information may not receive the information if the information providing device delivers the information at random.

SUMMARY OF THE INVENTION

To address the above-discussed deficiencies of the prior art, it is a primary object of the present invention to address at least the above-mentioned problems and/or disadvantages and to provide at least the advantages described below. Accordingly, an aspect of the present invention provides a system, method and apparatus capable of effectively providing information to peripheral Bluetooth devices by an information providing device during Bluetooth-based information broadcasting.

Another aspect of the present invention provides a system, method and apparatus capable of first providing information to a peripheral Bluetooth device requiring the information during information broadcasting.

A further aspect of the present invention provides a system, method and apparatus capable of optionally receiving information by a receiving Bluetooth device.

According to one aspect of the present invention, there is provided a method for providing information by an information providing device with a Bluetooth module in an information broadcast service based on Bluetooth. The method includes broadcasting an inquiry signal to provide the information; receiving an inquiry response signal; determining if a broadcast request is included in the inquiry response signal; and delivering the information to a Bluetooth device that sent the inquiry response signal, when a broadcast request is included in the inquiry response signal.

According to another aspect of the present invention, there is provided a system for providing information using Bluetooth. The system includes a Bluetooth device with a Bluetooth module, for setting a broadcast request input by a user, and sending an inquiry response signal including the broadcast request upon receipt of an inquiry signal; and an information providing device with a Bluetooth module, for storing the information, broadcasting the inquiry signal, receiving the inquiry response signal, determining if a broadcast request is included in the inquiry response signal, and delivering the information to the Bluetooth device when a broadcast request is included in the inquiry response signal.

According yet another aspect of the present invention, there is provided an information providing device for broadcasting information in a Bluetooth-based information broadcast service based on Bluetooth. The information providing device includes a Bluetooth module including a Bluetooth signal transceiver for broadcasting an inquiry signal to provide information, and receiving an inquiry response signal; and a controller for delivering the information to a Bluetooth device that sent the inquiry response signal, through the Bluetooth signal transceiver, when a broadcast request is included in the inquiry response signal.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged Bluetooth system.

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides an information providing device serving as a master device in an information broadcast service that broadcasts information to Bluetooth devices in a specific area through Bluetooth communication.

The information providing device discovers peripheral Bluetooth devices through an inquiry process before delivering or pushing, to the peripheral Bluetooth devices, an information message including information to be provided. In this context, the present invention ensures effective information delivery by finding, not only the peripheral Bluetooth devices, but also types of the information wanted by each of the Bluetooth devices in the inquiry process. That is, in accordance with the present invention, upon receipt of an inquiry signal from an information providing device, a Bluetooth device sends a broadcast request in an inquiry response signal when its user wants to receive information. Upon receipt of the inquiry response signal, the information providing device generates information requested by the Bluetooth device in compliance with the broadcast request included in the inquiry response signal, includes the information in an information message, and sends the information message to the Bluetooth device.

In Bluetooth communication, since the inquiry-response process is performed in a connectionless manner, the present invention may advantageously find out needs of a peripheral Bluetooth device's user without establishing connection between the information providing device and the peripheral Bluetooth device.

Figure 1:
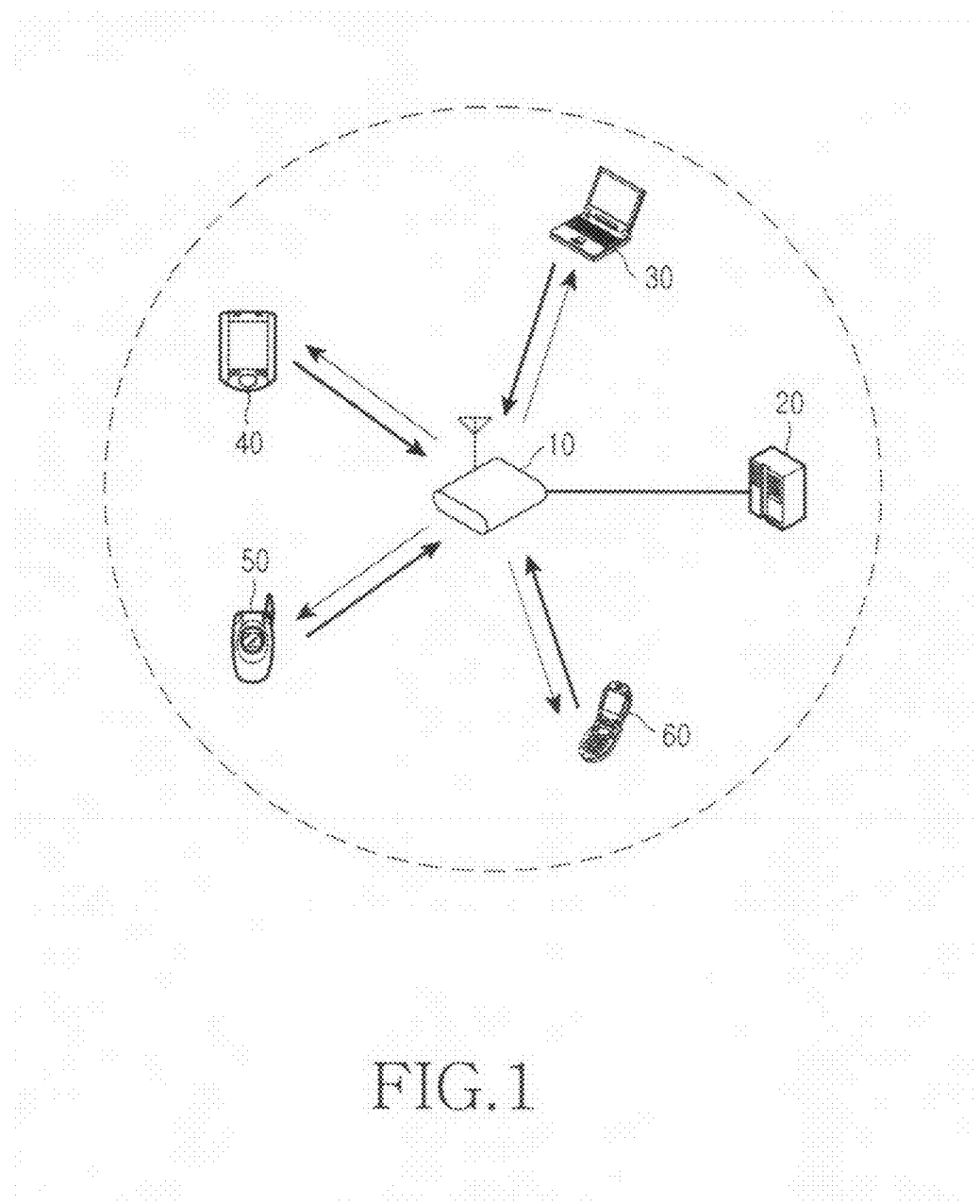
FIG. 1 illustrates a configuration of an information broadcasting system according to an exemplary embodiment of the present invention.

FIG. 1 illustrates an example of an information broadcasting system according to an exemplary embodiment of the present invention. Referring to FIG. 1, the information broadcasting system includes an information providing device 10, a management device or a monitoring/controlling system 20, and a plurality of Bluetooth devices 30, 40, 50 and 60.

Each of the Bluetooth devices 30, 40, 50 and 60, which are Bluetooth devices for receiving information from the information providing device 10, preferably includes a display device for displaying information received from the user and an input device for inputting a broadcast request according to an exemplary embodiment of the present invention. The broadcast request may be set by the user, and include a type of information to be received, a range of information, a spot where the user wants to receive the information, and a keyword associated with the information.

The monitoring/controlling system 20, a device providing a control interface between a manager and the information providing device 10, converts information provided from the information provider to a proper format and delivers the resultant information to the information providing device 10.

The information providing device 10 broadcasts the information provided from the monitoring/controlling system 20 to its peripheral Bluetooth devices 30, 40, 50 and 60. To this end, the information providing device 10 performs discovery on the peripheral Bluetooth devices 30, 40, 50 and 60 before the broadcasting. In accordance with an exemplary embodiment of the present invention, the information providing device 10 determines Bluetooth devices requesting information and characteristics of the information requested by the requesting Bluetooth devices, based on broadcast requests included in inquiry response signals received in the discovery process. Thereafter, the information providing device 10 generates information to be transmitted to the requesting Bluetooth devices according to the determined characteristics, and transmits the information to the Bluetooth devices.

Figure 2:
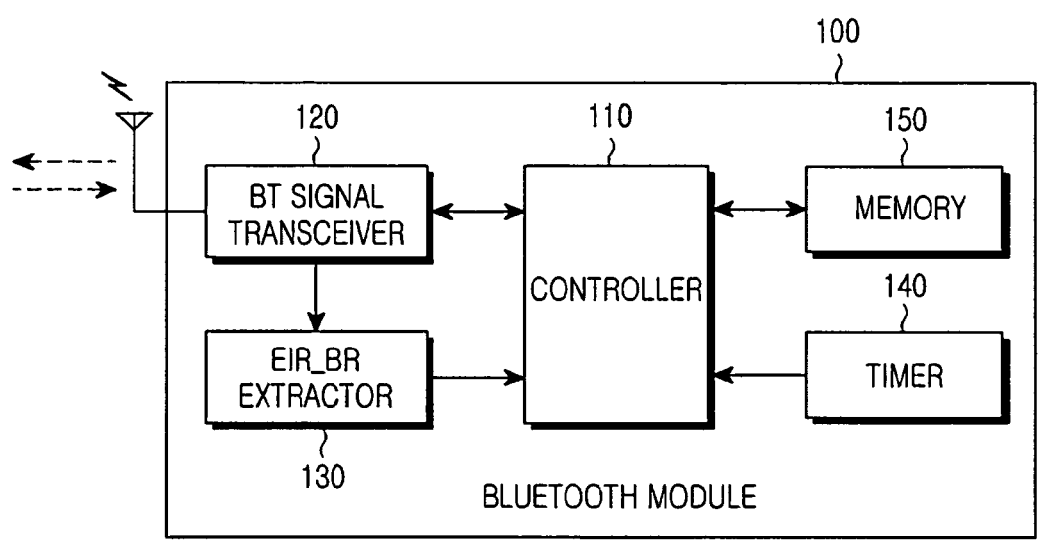
FIG. 2 illustrates a structure of a Bluetooth module in an information providing device according to an exemplary embodiment of the present invention.

FIG. 2 illustrates a structure of a Bluetooth module 100 included in the information providing device 10 according to an exemplary embodiment of the present invention. Referring to FIG. 2, the Bluetooth module 100 in the information providing device 10 includes a controller 110, a Bluetooth signal transceiver 120, a broadcast request extractor (EIR_BR extractor) 130, a timer 140, and a memory 150.

The timer 140 generates a timing signal and outputs it to the controller 110 to periodically send an inquiry signal according to an exemplary embodiment of the present invention.

The controller 110 controls the overall operation of the Bluetooth module 100. Upon receipt of the timing signal, the controller 110 controls the Bluetooth signal transceiver 120 to broadcast an inquiry signal.

Under the control of the controller 110, the Bluetooth signal transceiver 120 transmits and receives various signals and data used for Bluetooth communication. If the Bluetooth signal transceiver 120 broadcasts an inquiry signal and receives an inquiry response signal(s) in reply thereto, the Bluetooth signal transceiver 120 outputs the received inquiry response signal to the controller 110 and the broadcast request extractor 130.

The broadcast request extractor 130 parses the input inquiry response signal to determine if a broadcast request is included in the inquiry response signal, extracts the broadcast request if it is included, and outputs the extracted broadcast request to the controller 110.

The controller 110 stores an input broadcast request in the memory 150 in connection with its associated Bluetooth device. If no broadcast request is received from the broadcast request extractor 130 with regard to an arbitrary inquiry response signal, the controller 110 discards the arbitrary inquiry response signal so that the Bluetooth device that sent the arbitrary inquiry response signal is not registered as a peripheral Bluetooth device. The controller 110 generates information to be transmitted to the relevant Bluetooth device in response to the stored broadcast request.

The broadcast request includes information indicating whether or not the Bluetooth device will receive the information provided by an information broadcast service, and also includes a characteristic of the information to be received. This broadcast request is included in an inquiry response signal according to the present invention. In an exemplary embodiment of the present invention, information reception criteria are included in a significant part of an Extended Inquiry Response (EIR) signal.

The EIR signal, which is a signal defined by extending a function of the existing inquiry response signal, provides a discovered Bluetooth device with other information as well as information provided by the existing inquiry response signal, such as, for example, a device address, a device class, a clock and a message scan mode.

Figure 3:
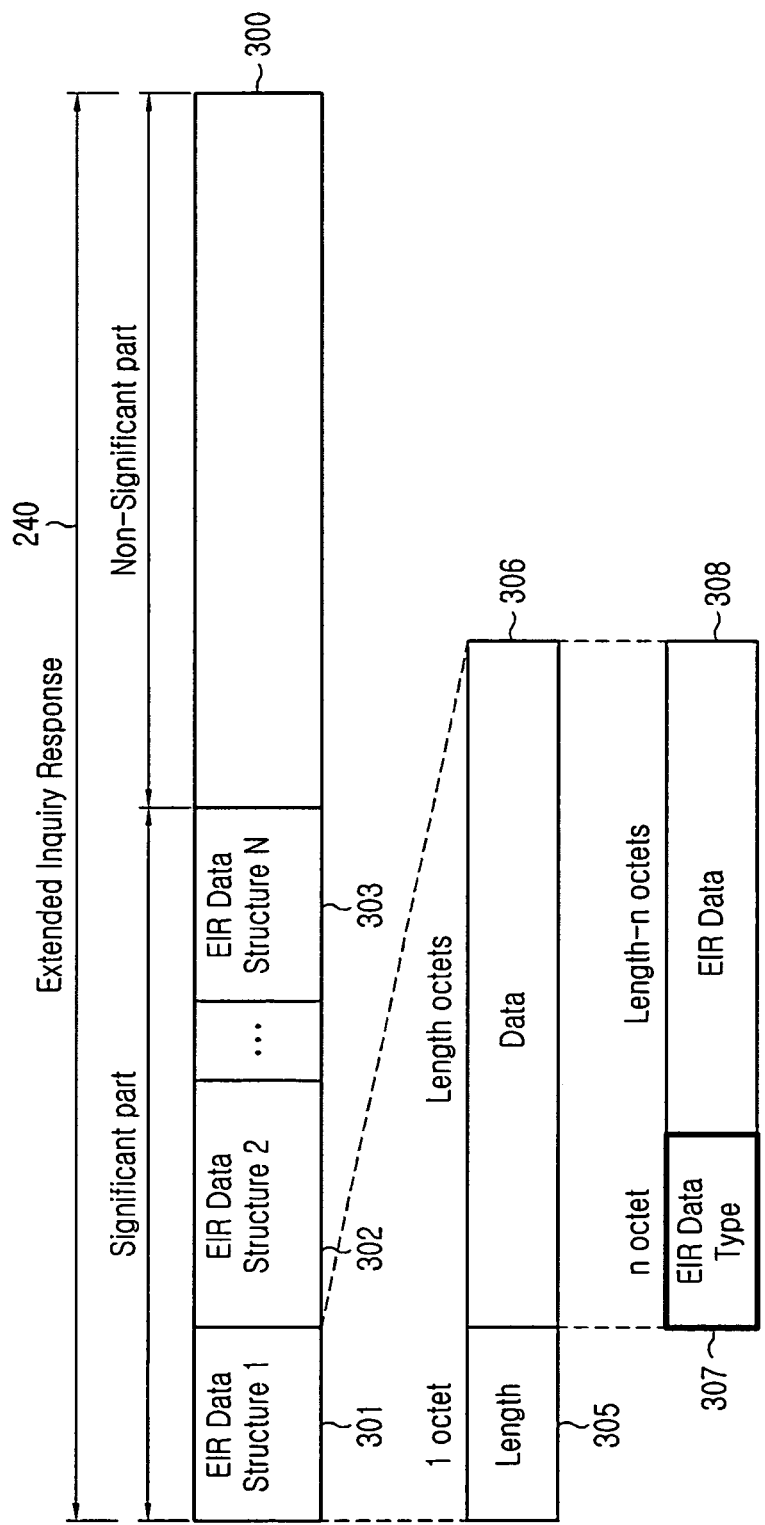
FIG. 3 illustrates a format of an extended inquiry response signal according to an exemplary embodiment of the present invention.

A data format of the EIR signal is illustrated in FIG. 3. Referring to FIG. 3, an EIR signal 300 generally has a length of 240 octets, and includes a significant part and a non-significant part. A plurality of EIR Data Structure fields 301, 302 and 303 are included in the significant part.

Each of the EIR Data Structure fields 301, 302 and 303 includes a Length field 305 and a Data field 306. The Data field 306 includes an EIR Data Type field 307 and an EIR Data field 308. Actual information is stored in the EIR Data field 308, and a value for identifying a type of data included in the EIR Data field 308 is stored in the EIR Data Type field 307. In accordance with exemplary embodiment of the present invention, a broadcast request is included in an inquiry response signal in the form of the EIR data structure field.

Types of the data stored in the EIR Data field 308 are shown in Table 1 below, and a broadcast request is newly added according to an exemplary embodiment of the present invention. In Table 1, a data type for the broadcast request is represented by an EIR Broadcast Requirement (EIR_BR), and is assigned an unused arbitrary value of "0x11".

TABLE 1

| EIR Data Type | Value | Description |
| --- | --- | --- |
| Flags | 0x01 | |
| Service Class UUIDs | 0x02/0x03 | 16-bit Service Class UUIDs |
| | 0x04/0x05 | 32-bit Service Class UUIDs |
| | 0x06/0x07 | 123-bit Service Class UUIDs |
| Local Name | 0x08 | Shortened local name |
| | 0x09 | Complete local name |
| Tx Power Level | 0x0A | |
| Secure Simple Pairing | 0x0D | Class of Device (3 bytes) |
| OOB | 0x0E | Simple Pairing Hash (16 bytes) |
| | 0x0F | Simple Pairing Randomizer R (16 bytes) |
| Device ID | 0x10 | |
| Manufacturer Specific Data | 0xFF | |
| EIR_BR | 0x11 | |

Figure 4:
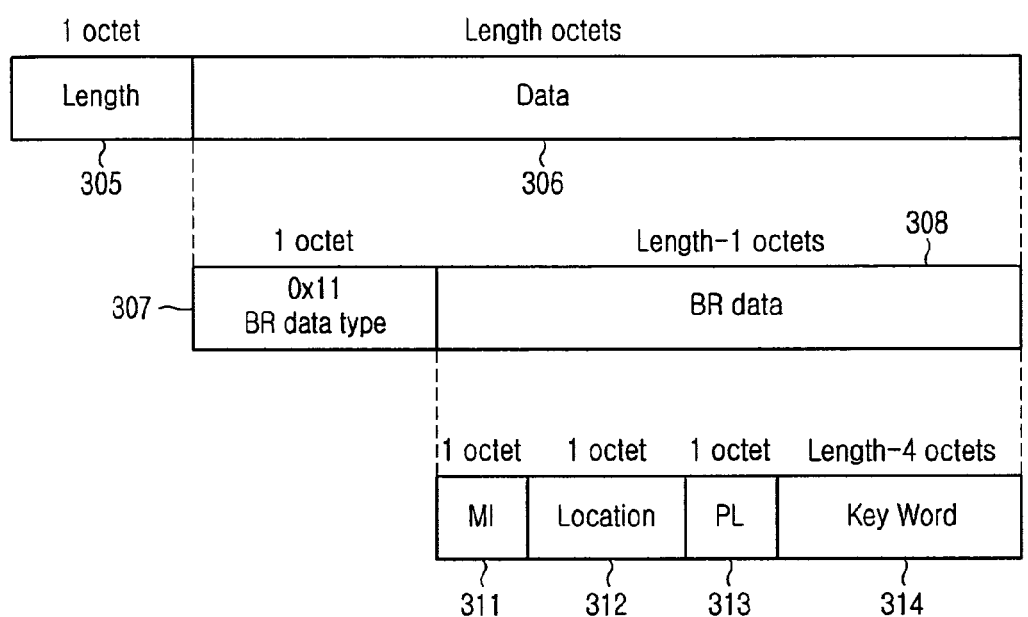
FIG. 4 illustrates a format of an extended inquiry response signal with a broadcast request included, according to an exemplary embodiment of the present invention.

FIG. 4 illustrates a format of an EIR Data Structure field with a broadcast request included, according to an exemplary embodiment of the present invention. Referring to FIG. 4, a Length field 305 stores the total size of a broadcast request included in the inquiry response signal 300, and is set as "0" if no broadcast request is included in the inquiry response signal 300. A Data field 306 includes an EIR Data Type field 307, in which a value "0x11" indicating that the currently stored information is a broadcast request, is stored, and an EIR Data field 308 in which detailed information of the broadcast request is included. The detailed information of the broadcast request includes information that becomes a criterion for information selection.

When the EIR Data field 308 includes detailed information of a broadcast request, it may include a Message Index (MI) field 311, a Location field 312, a Permissible Level (PL) field 315, and a Keyword field 314.

The MI field 311 is used to record an index of the information that a Bluetooth terminal that sent the inquiry response signal 300 has last received from the information providing device 10. In accordance with an exemplary embodiment of the present invention, all information messages provided by the information providing device 10 may be indexed, and indexes of information messages, delivered independently to respective Bluetooth devices, may be managed. In this manner, the Bluetooth device records an index of a message last received from the information providing device 10 in the MI field 311. Thus, the information providing device 10 prevents transmitting a duplicate information message by checking the MI field 311 included in the inquiry response signal. A value stored in the MI field 311 can be represented in the form of, for example, "0xXX."

A value indicating the spot where the user of the Bluetooth device wants to receive broadcasted information is recorded in the Location field 312. For example, the spots where the user wants to receive information may include public transportation means, culture/performance centers, shopping strips and the like. Examples of the spots and their associated field values are shown in Table 2 below.

TABLE 2

| Spot | Detailed Spot | Field Value |
| --- | --- | --- |
| Public Transportation | Bus | 0x01 |
|  | Subway | 0x02 |
|  | Train | 0x03 |
| Culture/Performance Center | Theater | 0x04 |
|  | Museum | 0x05 |
| Shopping Strip | Mall | 0x06 |
|  | Department Store | 0x07 |

The PL field 313 is used to indicate a permissible level of the information delivered from the information providing device 10. For example, this field can be used to request only the information matched with a keyword when the keyword is included in a broadcast request, or to request even the information associated with the keyword though the keyword is not included. This field can also determine even the detailed level of the provided information. For example, when the information is newspaper articles, a high PL is to request only headlines of the articles, while a low PL is to request even the details of the articles. When the information is about exhibits, the PL field 313 may request only names of the exhibits, or request even descriptions of the exhibits.

The Keyword field 314 is used to record a keyword associated with the information the user of the Bluetooth device wants to receive. The information providing device 10 can offer the user personalized information using a keyword included in the inquiry response signal. A size of the Keyword field 314 may be limited.

Although only three kinds of detailed information of a broadcast request have been mentioned in the foregoing description, any criteria for classifying information can be the detailed information. For example, a valid period of the information can also be the detailed information.

Figure 5:
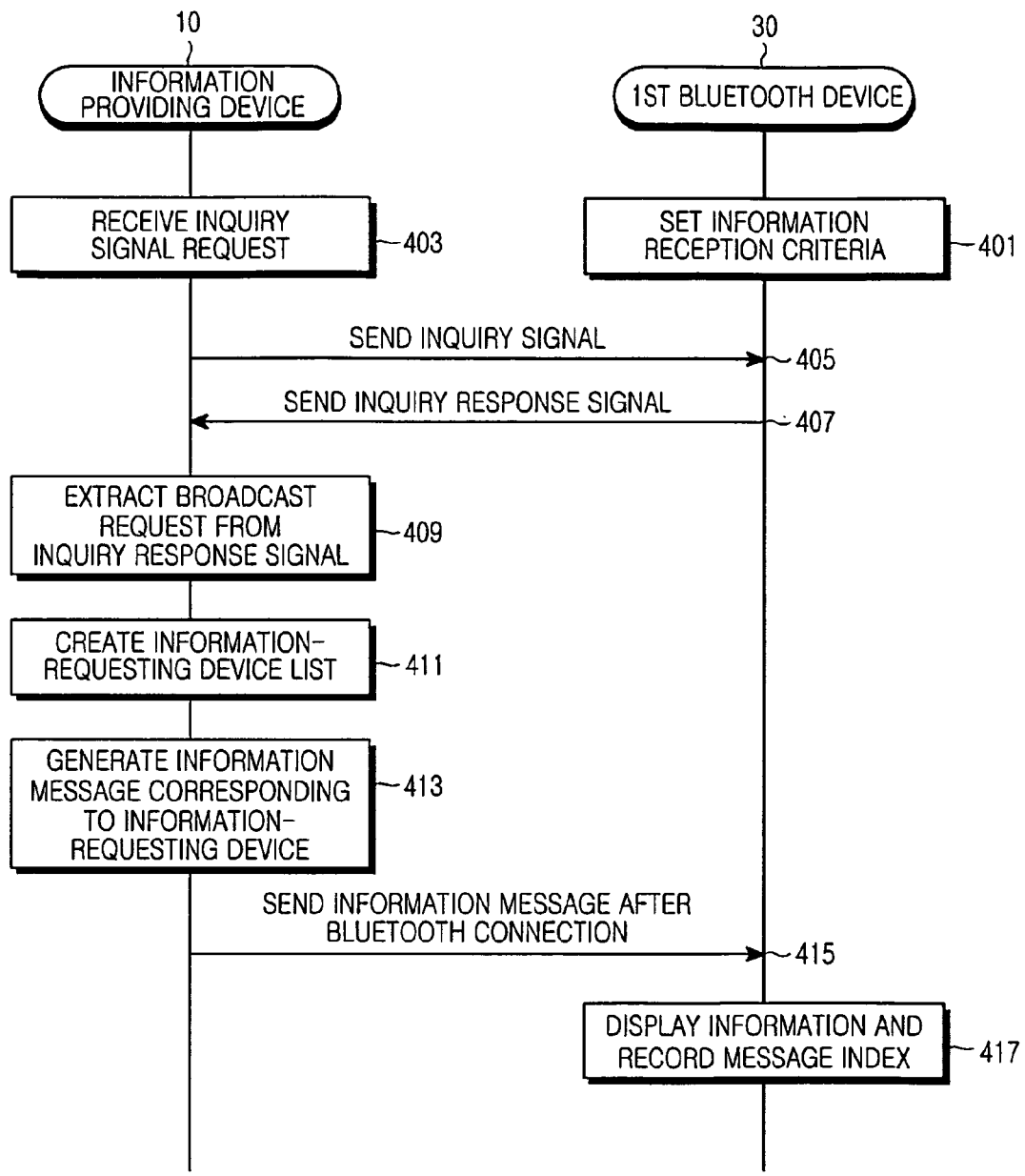
FIG. 5 illustrates an operation between an information providing device and a Bluetooth device according to an exemplary embodiment of the present invention.

Referring to FIGS. 1 and 5, a description will be made of an operation between the information providing device 10 and a Bluetooth device according to an exemplary embodiment of the present invention. For a better understanding of the present invention, FIG. 5 illustrates an operation between the information providing device 10 and a first Bluetooth device 30, a broadcast request for which is set by a user.

If respective users of the Bluetooth devices 30, 40, 50 and 60 intend to receive information from the information providing device 10, the users will manipulate a user interface provided in the Bluetooth devices 30, 40, 50 and 60 in order to set detailed information of a broadcast request in the respective devices. For example, if the information broadcast service is a service for providing station-related information in the subway, the user may enter "subway" as an information-receiving spot, or "Yankee Stadium" as a keyword. If the user doesn't want to receive information, he or she may enter no detailed information of the broadcast request.

Accordingly, the Bluetooth devices 30, 40, 50 and 60 set broadcast requests corresponding to inputs from users. At least one of the detailed information of the broadcast request should be entered in order to set the broadcast request, and the set broadcast request is included in a response signal in step 401.

The information providing device 10 broadcasts an inquiry signal to the peripheral devices periodically or when an inquiry signal request is received from the monitoring/controlling system 20, in step 403. Then the Bluetooth devices 30, 40, 50 and 60 located in the vicinity, or coverage, of the information providing device 10 will receive the inquiry signal in step 405.

Upon receipt of the inquiry signal, the Bluetooth devices 30, 40, 50 and 60 send an inquiry response signal to the information providing device 10 in step 407. If a broadcast request was set by the user in step 401, the set broadcast request is included in the inquiry response signal, and if no broadcast request was set, no broadcast request is included in the inquiry response signal. An index of the last received information message can also be included in the broadcast request.

Upon receipt of the inquiry response signal, the information providing device 10 determines if a broadcast request is included in the inquiry response signal and extracts the broadcast request if it is included, in step 409. In step 411, the information providing device 10 generates an information-requesting device list that includes the Bluetooth devices that sent inquiry response signals in which a broadcast request. For example, an inquiry response signal sent by the first Bluetooth device 30 includes "Subway" as an information-receiving spot. Additionally an inquiry response signal sent by the second Bluetooth device 40 includes "Yankee Stadium" as a keyword, and an inquiry response signal sent by the third Bluetooth device 50 includes no broadcast request. In this example, only the first and second Bluetooth devices 30 and 40 are included in the information-requesting device list.

Thereafter, in step 413, the information providing device generates an information message corresponding to each information-requesting device in response to a broadcast request associated with the information-requesting device. If the information providing device 10 is installed in subway trains to provide subway information and generates the information-requesting device list, the information providing device 10 will include all information in the information message corresponding to the first Bluetooth device 30. The information providing device 10 will include only the information related to "Yankee Stadium" in the information message corresponding to the second Bluetooth device 40. For example, information about junctions or the number of stops to go to "Yankee Stadium" may be included. If there is no information related to "Yankee Stadium" in the information, no information message may be generated.

In step 415, the information providing device 10 Bluetooth-connects with each information-requesting device, and delivers the generated information message to the device. When the delivery of the information message is completed, the connection is released. That is, the information providing device 10 may set connections to the first Bluetooth device 30 and the second Bluetooth device 40, and send the generated information messages to the devices.

Upon receipt of the information message, the first Bluetooth device 30 displays information included in the information message and stores an index of the information message in step 417.

After a lapse of a predetermined time, the information providing device 10 will repeat the above operation.

Therefore, during information broadcasting by Bluetooth, a peripheral Bluetooth device of an information providing device sets a broadcast request in an inquiry response signal and sends the inquiry response signal so that information can be more effectively and efficiently provided to the peripheral device. In addition, a user of the peripheral Bluetooth device can optionally request desired information and receive the requested information. Also, the information can be provided first to the Bluetooth device requiring the information.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, Read-Only Memory (ROM), Random-Access Memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents. For example, in the forgoing description, a broadcast request is included in the inquiry response signal when at least one of the detailed information is set. However, the broadcast request may also be included in the inquiry response signal without the detailed information. In addition, the controller 110 may extract the broadcast request without the broadcast request extractor 130.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing information by an information providing device with a Bluetooth module in an information broadcast service based on a Bluetooth protocol, the method comprising:
    broadcasting an inquiry signal to a plurality of Bluetooth devices;
    receiving an information broadcast request from at least one Bluetooth device among the plurality of Bluetooth devices;
    displaying a list of the at least one Bluetooth device that transmits the information broadcast request; and
    transmitting information to the at least one Bluetooth device included in the displayed list, wherein transmitting the information comprises:
    selecting information corresponding to the information broadcast request, wherein selecting the information comprises selecting information based on a criterion for classifying the information, the criterion being set by a user of the at least one Bluetooth device and included in the information broadcast request; and
    generating an information message including the selected information.

2. The method of claim 1, wherein transmitting the information comprises:
    connecting, via a Bluetooth-connection, with the at least one Bluetooth device included in the displayed list.

3. The method of claim 2, wherein transmitting the information further comprises delivering the information message to the at least one connected Bluetooth device.

4. The method of claim 1, wherein the criterion includes at least one of a location where the information is to be received, a keyword, and a permissible level indicating a detailed level of the information is to be received.

5. The method of claim 1, wherein transmitting the information comprises:
    connecting, via a Bluetooth-connection, with the at least one Bluetooth device included in the displayed list.

6. A system for providing information using Bluetooth, comprising:
    a plurality of Bluetooth devices configured to set an information broadcast request input by a user, receive an inquiry signal, and transmit an information broadcast request corresponding to the inquiry signal; and
    an information providing device configured to broadcast the inquiry signal to the plurality of the Bluetooth devices, receive the information broadcast request from at least one Bluetooth device among the plurality of the Bluetooth devices, display a list of the at least one Bluetooth device that transmits the information broadcast request, and transmit information to the at least one Bluetooth device included in the displayed list,
    wherein the information providing device is further configured to select information corresponding to the information broadcast request, and generate an information message including the selected information, and
    wherein the information broadcast request includes a criterion for classifying the information, and the information providing device is further configured to select the information based on the criterion included in the information broadcast request.

7. The system of claim 6, wherein the information providing device is further configured to connect with the at least one Bluetooth device included in the displayed list via a Bluetooth-connection, and deliver the information message to the at least one connected Bluetooth device.

8. The system of claim 6, wherein the criterion includes at least one of a location where the information is to be received, a keyword, and a permissible level indicating a detailed level of the information is to be received.

9. The system of claim 6, wherein the information providing device is further configured to connect, via a Bluetooth-connection, with the at least one Bluetooth device included in the displayed list.

10. The system of claim 9, wherein each of the plurality of Bluetooth devices is configured to provide a user interface for inputting a criterion for classifying the information, and to generate the information broadcast request including the criterion.

11. An information providing device for broadcasting information in a Bluetooth-based information broadcast service based on a Bluetooth protocol, the device comprising:
    a Bluetooth signal transceiver configured to broadcast an inquiry signal to a plurality of Bluetooth devices, and receive an information broadcast request from at least one Bluetooth device among the plurality of Bluetooth devices; and
    a controller configured to control displaying a list of the at least one Bluetooth device that transmits the information broadcast request, and transmit information to the at least one Bluetooth device included in the displayed list,
    wherein the controller is further configured to select information corresponding to the information broadcast request, and generate an information message including the selected information, and
    wherein the broadcast request includes a criterion for classifying the information, and the controller is further configured to select the information based on the criterion being set by a user of the at least one Bluetooth device and included in the information broadcast request.

12. The information providing device of claim 11, wherein the controller is further configured to connect, via a Bluetooth-connection, with the at least one Bluetooth device included in the displayed list, and deliver the information message to the at least one connected Bluetooth device.

13. The information providing device of claim 11, wherein the criterion includes at least one of a location where the information is to be received, a keyword, and a permissible level indicating a detailed level of the information is to be received.

14. The information providing device of claim 11, wherein the controller is further configured to connect, via a Bluetooth-connection, with the at least one Bluetooth device included in the displayed list.

* * * * *